US009832268B2

(12) United States Patent
Mehra (10) Patent No.: US 9,832,268 B2
(45) Date of Patent: Nov. 28, 2017

(54) SYSTEM, METHOD, AND MEDIUM FOR MANAGING PRIORITY IN REQUESTS TO IN-MEMORY DATA GRID (IMDG)

(71) Applicant: Software AG USA Inc., Reston, VA (US)

(72) Inventor: Gagan Mehra, Oakland, CA (US)

(73) Assignee: Software AG USA Inc., Reston, VA (US)

( * ) Notice: Subject to any disclaimer, the term of this patent is extended or adjusted under 35 U.S.C. 154(b) by 406 days.

(21) Appl. No.: 14/471,088

(22) Filed: Aug. 28, 2014

(65) Prior Publication Data

US 2016/0065673 A1 Mar. 3, 2016

(51) Int. Cl.
*G06F 15/16* (2006.01)
*H04L 29/08* (2006.01)
*H04L 29/06* (2006.01)

(52) U.S. Cl.
CPC .......... *H04L 67/1097* (2013.01); *H04L 67/10* (2013.01); *H04L 67/1091* (2013.01); *H04L 67/322* (2013.01); *H04L 67/42* (2013.01)

(58) Field of Classification Search
None
See application file for complete search history.

(56) References Cited

U.S. PATENT DOCUMENTS

| 6,970,936 | B2 * | 11/2005 | Fields, Jr. | ........... G06F 12/0811 709/203 |
| 7,111,006 | B2 * | 9/2006 | Vange | .................... G06F 9/5027 |
| 8,141,087 | B2 | 3/2012 | Chauvet et al. | |
| 9,246,986 | B1 * | 1/2016 | Ward, Jr. | ................ H04L 67/10 |
| 2012/0089681 | A1 | 4/2012 | Chowdhury et al. | |
| 2012/0324196 | A1 | 12/2012 | Maillet et al. | |
| 2013/0086154 | A1 * | 4/2013 | Junnarkar | ............... H04L 67/26 709/203 |

(Continued)

OTHER PUBLICATIONS

Wei-Tek Tsai et al., "Prioritizing Service Requests on Cloud with Multi-tenancy", 7th International Conference on e-Business Engineering (ICEBE), pp. 117-124. Nov. 10-12, 2010, Shanghai, China. (Abstract only).

(Continued)

*Primary Examiner* — Viet Vu
*Assistant Examiner* — James Edwards
(74) *Attorney, Agent, or Firm* — Posz Law Group, PLC (57) ABSTRACT

An in-memory data grid (IMDG) server includes an i/o interface for transmitting and receiving data over a network. A random access memory (RAM) is configured with the IMDG which stores plural different data sets that may be requested for retrieval by applications that can connect to the IMDG server through the network. A processor receives requests for retrieval of data from the IMDG data sets, and sends the requested data to the requesting application. The IMDG server also includes a request prioritizer that determines, when two or more applications, which are competing applications that defined as having requests co-pending at the IMDG server to retrieve one or more of the data sets, which of the competing applications has the highest priority relative to the other competing applications. The request prioritizer causes a data set requested by the application with the highest priority to be handled before requests from the applications.

17 Claims, 5 Drawing Sheets

(56) References Cited

U.S. PATENT DOCUMENTS

| | | | | |
|---|---|---|---|---|
| 2013/0226891 A1* | 8/2013 | Markus | ............ | G06F 17/30356 |
| | | | | 707/703 |
| 2013/0263109 A1* | 10/2013 | Wang | ...................... | H04L 67/34 |
| | | | | 717/171 |
| 2014/0192725 A1* | 7/2014 | Black | .................... | H04W 72/10 |
| | | | | 370/329 |
| 2014/0195744 A1* | 7/2014 | Fleischer | ................ | G06F 13/18 |
| | | | | 711/151 |
| 2014/0282626 A1* | 9/2014 | Muguda | .................... | G06F 9/54 |
| | | | | 719/328 |

OTHER PUBLICATIONS

Qihong Shao, "Towards the Effective and Intelligent Multi-tenancy SaaS", Arizona State University, May 2011. (Abstract only).
Indrakshi Ray et al., "A Spatio-Temporal Role-Based Access Control Model", Proceedings of the 21st annual IFIP WG 11.3 working conference on Data and applications security, pp. 211-226. Jul. 8, 2007, Heidelberg, Germany.

* cited by examiner

FIG. 5 under control of the IMDG, whether at least two of the applications are competing applications that have requests, which are simultaneously pending at the IMDG server, for retrieval of data from the IMDG.

SYSTEM, METHOD, AND MEDIUM FOR MANAGING PRIORITY IN REQUESTS TO IN-MEMORY DATA GRID (IMDG)

TECHNICAL FIELD

The technical field relates in general to resolving priority among data retrieval requests from a host, and more particularly to resolving priority in retrieval requests from possible multiple tenants using a remote host network, commonly referred to as a "cloud."

BACKGROUND

Two trends that are currently shaping the IT landscape in a significant way are cloud computing and in-memory management. As is well known in the art, cloud computing can be viewed simply as storing and accessing data and programs over the Internet (or conceivably some other network) instead of a user's local hard drive. Stated another way, cloud computing can be viewed as simply delivering hosted services over the Internet.

Almost every application that was formerly deployed locally is now available via the cloud. With increasing data volumes, more data velocity, and greater number of users, it is almost a given that cloud computing applications use some form of in-memory computing. The in-memory data grid (IMDG) is a known data structure that resides entirely in RAM (random access memory), and may or may not be distributed among multiple servers. A RAM programmed with an IMDG, either over a single or multiple servers, may be referred to as an IMDG server or IMDG system, or similar language.

The design of an IMDG lends itself to storing and retrieving data for multiple applications. A side effect of extensive cloud computing is that a situation in which applications are competing for the same data may result in a deadlock situation in the IMDG and can adversely affect performance on one or more of the applications.

SUMMARY

Accordingly, one or more embodiments provide a method, system and/or non-transitory computer readable medium for managing priority requests to an in-memory data grid (IMDG).

Accordingly, one or more embodiments provides an IMDG server which comprises at least an i/o interface for transmitting and receiving data over a network; a random access memory (RAM) configured with the IMDG, the IMDG stores a plurality of different data sets that may be requested for retrieval by one or more of a plurality of applications configured to be connected to the IMDG server through the network; and a processor, which is cooperatively operable with the i/o interface and the RAM. The processor is configured to receive, from a requesting application, requests for retrieval of data from one or more of the different data sets of the IMDG, and send requested data to the requesting application. The processor is also configured to determine, in a request prioritizer, whether at least two of the applications are competing applications that have requests, which are simultaneously pending at the IMDG server, for retrieval of data from the IMDG. Further, the processor is configured to, in the request prioritizer, when there are competing applications: (a) determine which of the competing applications, with the simultaneously pending requests, has a highest priority relative to other ones of the competing applications; and (b) cause the simultaneously pending requests which were requested by the competing application determined to have the highest priority, to be responded to before requests requested by the competing applications not determined to have the highest priority.

In another embodiment, the request prioritizer is further configured to determine an explicit highest priority application among the competing applications based on an explicit request by an IMDG client that coordinates the competing applications, the explicit request further establishing internal rules for determining which of the applications has the highest priority.

In yet another embodiment the request prioritizer is further configured to determine whether a totality of all data set retrieval requests from all applications is less than a second threshold over a same given time frame; limit transmission of data sets for the explicit highest priority application to a pre-determined limit, when it is determined that the totality of all data set retrieval requests from all applications is not less than the second threshold; and avoid limiting transmission of data sets for the explicit highest priority application to a pre-determined limit, when it is determined that the totality of all data set retrieval requests from all applications is less than a second threshold.

In still another embodiment, the request prioritizer is further configured to determine, among the competing applications, which is the highest priority application, based on an internal predetermined priority policy of the IMDG server.

In a further embodiment, the request prioritizer is further configured to: determine, among the competing applications, whether one of the competing applications is a frequency-type highest priority application based on a determination that a frequency of requests for data sets of the one of the competing applications exceeds a pre-determined threshold over a predetermined period of time; and assign the frequency-type priority application as having the highest priority.

In still a further embodiment, the request prioritizer is further configured to: determine whether there is a diminishment in the frequency of requests from the frequency-type highest priority application for data sets to below the pre-determined threshold over the predetermined period of time; and de-assign the frequency-type highest priority application away from having the highest priority.

In yet a further embodiment, the request prioritizer is further preconfigured to recognize a predetermined time of day or an entire predetermined day as being a peak time for a particular application to predictably make a high number of data retrieval requests to the IMDG server; and when the request prioritizer recognizes the predetermined time of day or the entire predetermined day as the peak time for the particular application to likely make the high number of data retrieval request to the IMDG server, assign the particular application likely to make an exceedingly high number of data retrieval request as having the highest priority.

Another embodiment can provide an in-memory data grid (IMDG) server comprising a random access memory (RAM), a request prioritizer processor, and a transceiver. The RAM is configured with the IMDG, the IMDG storing a plurality of differing data sets that may be requested for retrieval transmission to one or more of a plurality of applications connected to the server computer through the network. The transceiver is of course for transmitting and receiving data over a network.

The request prioritizer processor, which is cooperatively operable with the RAM and the transceiver, determines, when two or more of the applications are competing applications that request retrieval transmission of one or more of the data sets at approximately the same time, which application has highest priority. In this manner, a data set requested by the application with the highest priority is firstly transmitted. Similar method and mediums are also presented in this disclosure.

One, or a combination of more than one, or all, of the above embodiments, can be combined and provided as a single embodiment.

The purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

I. State of the Art and Observations

Relevant features of representative conventional products and documents which are indicative of the state of the art are now briefly reviewed and the inventor's observations on some example deficiencies are summarized.

There are several In-Memory Data Grid (IMDG) products that are sold for use in cloud computing, and that can be used with multiple applications at the same time. However, none of these products provide a feature to handle requests based on specific priorities defined for an application. Such a deficiency would be analogous to a high priority customer calling an enterprise using a telephone system, and then having to wait 10 minutes for lower priority callers who were perhaps callers internal to the enterprise. A cloud computing system with multiple tenants might need, for example, to be able to identify whether data retrieval requests are all from internal applications and/or whether a customer application should be given priority to minimize wait time. No state of the art solutions exists for an IMDG setup as described above.

U.S. patent application Ser. No. 13/163,741 to Maillet et al. (published as U.S. Patent Application Publication No. 2012/0324196) describes, among other things, a memory management system that receives information from applications describing how memory is being used, and that allows an application host to exert more control over application requests for using memory. The system provides an application memory management application-programming interface (API) that allows the application to specify more information about memory allocations that is helpful for managing memory later. However, this application's relevance in this context is only to memory management within a single application using an API provided to optimize memory. U.S. application Ser. No. 13/163,741 does not at all consider prioritizing requests across multiple applications for use with an IMDG in the cloud, and consequently does not address the relevant complexities.

U.S. Pat. No. 8,141,087 to Chauvet et al. relates to a system for resolving computing resource deadlocks in execution of processes. However, U.S. Pat. No. 8,141,087 focuses on deadlocked processes, and does not consider requests and demands for retrieving data. Additionally, the patent's relevance in this context is again limited to resolution of deadlock in a single application rather than prioritization among demands from multiple applications. Cloud computing and its implications are not considered at all in U.S. Pat. No. 8,141,087.

A journal article entitled "Prioritizing Service Requests on Cloud with Multi-tenancy" by Tsai et al. acknowledges the fact that cloud computing often uses a multi-tenant architecture where tenants share application and system software. In responding to the challenge of request prioritization in this architecture, this reference describes, among other things, an algorithm called the "crystalline mapping" algorithm to prioritize the calls by mapping the priorities from local tenants to global priorities. However, mapping local priorities onto global priorities simply will not work in an IMDG environment as discussed herein.

A dissertation entitled "Towards Effective and Intelligent Multi-tenancy [Software as a Service] SaaS" by Qihong Shao focuses on, among other things, building more intelligent SaaS applications by using demand prediction and prioritization models. As an IMDG stores transient data, if techniques are employed as described in the Qihong Shao dissertation, models will have to be constantly updated. By comparison, as described further below, the presently disclosed embodiments can use up to four or even more ways of prioritizing requests when applications are interacting with a hosted IMDG solution. Continuous updates are therefore not required according to embodiments further disclosed herein.

U.S. patent application Ser. No. 12/898,711 to Chowdhury et al. (published as U.S. Patent Application Publication No. 2012/0089681) discloses, among other things, prioritizing messages in a cloud-based environment and further discloses prioritizing messages based on scoring the messages. However, in an IMDG environment, this is simply not possible as performance among applications from multiple tenants is critical, and not available for disparate scoring. As well, an additional server must be deployed.

Turning to a specific commercial offering in this area, GigaSpaces is an IMDG vendor. GigaSpaces provides, among other things, multi-tenancy support built into its offering. However, the support is for multiple in-memory models that are part of the same deployment. This is not equivalent to supporting multiple applications in a single hosted IMDG deployment, as is disclosed herein.

Succinctly put, the conventional art fails to provide a sufficient solution to the problems of resource locking and performance degradation experienced by applications running in a multi-tenant IMDG environment. As indicated above, there could be serious consequences detrimental to the success of a business if a solution is not found.

As a fairly straight forward example of the disadvantages of the conventional art, consider that 40% of visitors leave an electronic commerce website if takes three seconds or more for a web page to load. With a 2% conversion rate, 0.8% of the visitors would have bought something if the site responsed more quickly. The herein disclosed and claimed embodiments can aid troubled merchants in recouping these losses by prioritizing requests from the website versus a back-end system.

It should be again emphasized that implementation of prioritization in databases and operating systems has recently advanced. Nevertheless, this type of prioritization contrasts remarkably with the herein-disclosed implementation where one application such as IMDG can take requests from multiple applications that may be running anywhere, with the IMDG having very little knowledge about these applications.

II. Introduction to Concept

In overview, the present disclosure concerns a system, method, and/or computer-readable medium for managing priority in requests to an In-Memory Data Grid (IMDG), which can resolve these and other issues by managing requests from multiple applications for the same data, based on a variety of factors, in an IMDG so as to improve efficiency in the applications. More particularly, a "request prioritizer" can be provided to, for example, analyze several different factors, so as to prioritize the incoming requests to an IMDG prior to delivery of data back to an application. Accordingly, the applications which may be deemed as more important for various reasons can perform faster, with the intention of thereby promoting or supporting greater revenue and happier customers.

The present disclosure is specifically directed to determining priority among competing requests for data in a cloud hosted IMDG. The communication from an application to a cloud hosted IMDG of course occurs over communication networks. Such communication networks may provide services such as data communications, signal, and/or video services. Such networks can include network infrastructure devices which transfer the communications between wireless and/or wire line devices, for example, by forwarding the communications which may have been broken into communication packets. The network infrastructure devices may include those providing or facilitating voice communications services networks, such as edge routers, media gateways, centralized media gateways, session border controllers, trunk gateways, media boxes, call servers, and the like, and variants or evolutions thereof.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

One or more embodiments discussed herein can address the aforementioned problems with traditional systems, by prioritizing IMDG client requests using various strategies. One or a combination of specific rules may be used to counteract any contention, for example, a client requiring a priority increase which is not treated as unlimited, as well as others discussed herein.

III. Aspects of the Approach

The present disclosure accepts as a premise that all applications are not equally important while accessing a shared IMDG hosted in the cloud. This fact may be especially relevant when the applications are using the same data that is stored in the shared IMDG. This can be easily seen in the example discussed below, where an eCommerce environment has multiple applications using an IMDG which is hosted in the cloud.

Figure 1:
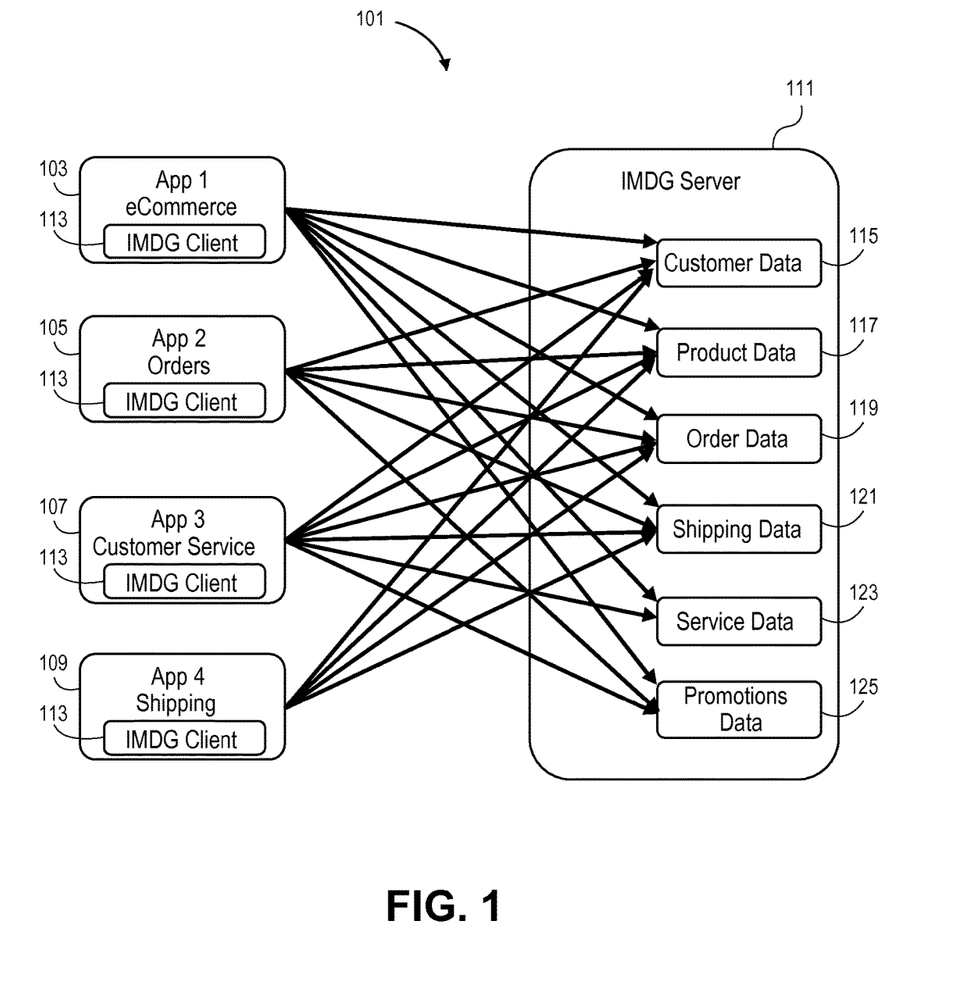
FIG. 1 is a diagram illustrating a system in which applications conventionally request data to a cloud-hosted IMDG.

This concept is easily seen in FIG. 1 which is a diagram illustrating an IMDG system 101 in which each of applications conventionally requests data from a cloud-hosted IMDG, and the IMDG server 111 returns the requested data to the application which requested the data. In FIG. 1, plural applications, here represented by four applications 103, 105, 107, 109, which may be different applications, are accessing the IMDG server 111. Each application 103, 105, 107, 109 in this illustration is also using an IMDG client 113 so if the data is kept in-memory locally, the application does not need to send a request for the data to the IMDG system/server 111.

Only an eCommerce application 103 out of the four applications 103, 105, 107, 109 is an initial customer-directed application. However, all four applications, including in particular a Customer Service 107 application, but an Orders 105 application and a Shipping 109 application as well, may be using the same data from the IMDG server 111. The different applications 103, 105, 107, 109 may transmit a request one or more of the different sets of data to the IMDG server 111, for example, here represented by: customer data 115, product data 117, order data 119, shipping data 121, service data 123, and promotions data 125.

Described another way, the IMDG system 101 can operate, as illustrated, where each of applications 103, 105, 107, 109 may function as part of a larger unifying program or application. In such a case, all the data stored in the IMDG structure will generally be in some way related. Alternatively however, each of applications 103, 105, 107, 109 may be unrelated applications that simply utilize the IMDG system for cost savings and efficiency. Such an arrangement may be a multi-tenant system in which a single instance of the application serves multiple clients. This duality of type of use may be true for an IMDG system disclosed herein, except as where expressly described as belonging to a single client.

Without a request prioritization system, there is a strong likelihood that the eCommerce application 103 will be adversely impacted as the IMDG server 111 serves requests from other applications 105, 107, 109 which compete for IMDG resources, thereby potentially delaying a response to the request for the data from the eCommerce application 103. This of course may result in a bad experience for the customer using the eCommerce application, and could lead to diminished revenue from the customer or even losing the customer for life. It should additionally be noted that the customer service application 107 also may reflect a direct interaction with a customer (although not an initial contact) such that delayed server requests while the IMDG server 111 is working with the other applications will also have an adverse impact on customer satisfaction.

A solution for the above issues is to grant different priorities to different requests from the different applications. That is, an IMDG prioritization system 201 illustrated, for example, in FIG. 2, may serve specific requests faster than other different requests. The prioritization system 201 in this example can have the same conventional client-side eCommerce application 203, Orders application 205, Customer Service application 207, and Shipping application 209 as discussed previously, so that differences to the users can be transparent. The prioritization system 201 can also maintains customer data 215, product data 217, order data 219, shipping data 221, service data 223, and promotions data 225 in the IMDG Server 211, including the above-discussed techniques. However, the disclosed IMDG prioritization system 201 further includes, in the IMDG server 211, the new request prioritizer 213 component.

Figure 2:
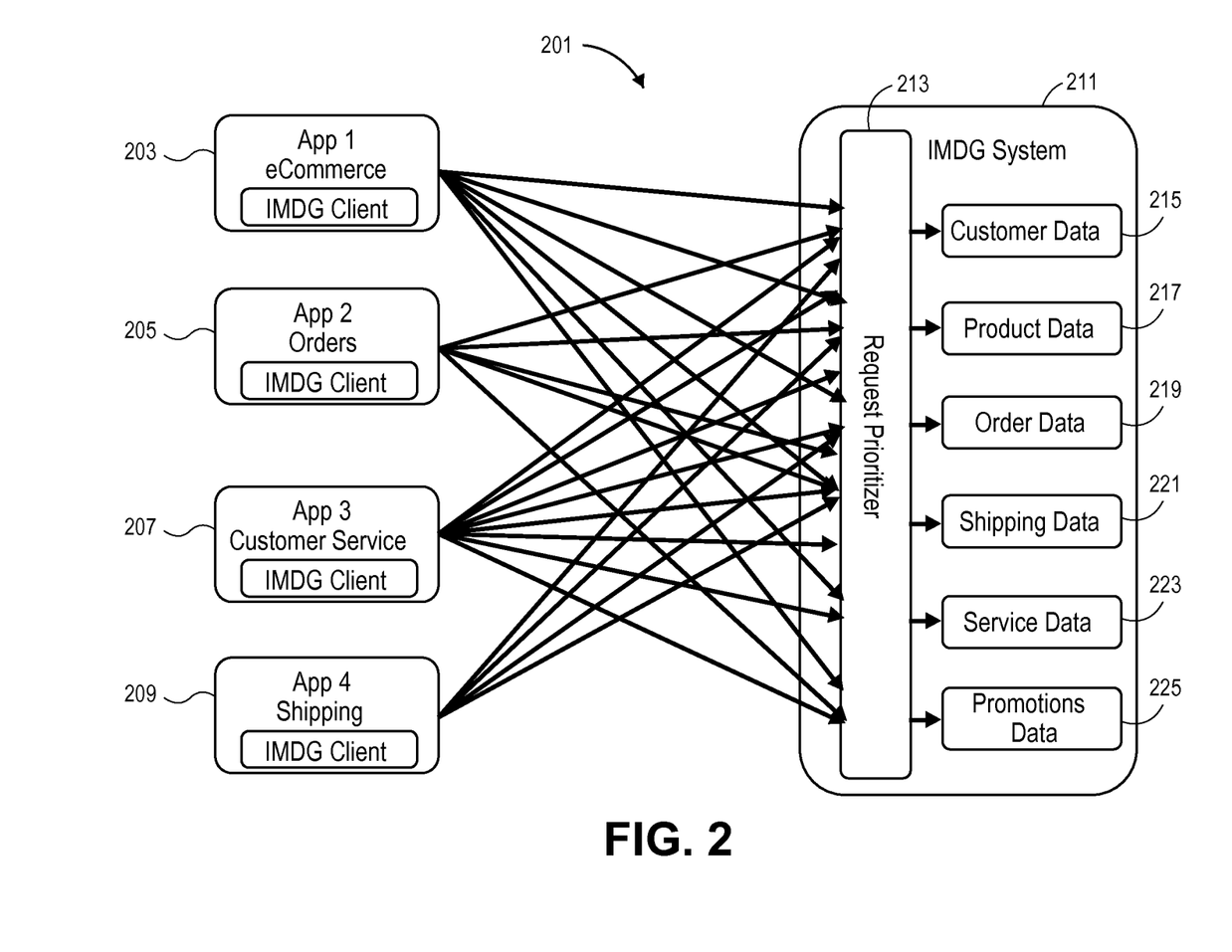
FIG. 2 is a diagram illustrating an IMDG prioritization system/server in which applications request data to a cloud-hosted IMDG that uses a request prioritizer.

The request prioritizer 213 can play a very important role in large deployments with thousands of applications accessing the same in-memory space. The request prioritizer 213 can use one or more of various different approaches when prioritizing requests. Four approaches are now discussed by way of overview. The subsequent section provides additional implementation details for the approaches.

A. Requests Coming from Specific Application(s) can be Configured (by the IMDG Server) to be Responded to in a Higher Priority.

Such an approach may be viewed as a "predetermined priority approach." In the predetermined priority approach, a configuration can be implemented such that requests are handled from the four applications in a predetermined particular order which is assigned based on the type application which issued the data request: (1) requests from eCommerce 203 applications are handled as a first priority, (2) requests from Customer Service 207 applications are handled as a second priority which is lower than the first priority, (3) requests from Orders 205 applications are handled as a third priority which is lower than the second priority, and (4) requests from Shipping 209 applications are handled as a fourth priority which is lower than the third priority. The request prioritizer 213 reviews each request, determines the priority which correlates to the application which issued the data request, assigns the correlated priority to the request, processes each data request (among the data requests which have been received) according to the priority which it was assigned (which relates to the application which issued the data request), and accordingly forwards each request to IMDG server 211. Irrespective of the volume of requests from each application, in this example the eCommerce 203 application maintains highest priority, and its requests are responded to first.

B. Requests from Specific Application(s) can be Prioritized Based on the Frequency of Requests from the Application(s)

This approach may be viewed as a "frequency approach." In the frequency approach, requests coming from a specific application can be prioritized based on the frequency of requests from the particular application over a period of time. Thus, if a particular application is providing voluminous requests, as may happen for example with the eCommerce application on a particularly heavy shopping day (for example so-called Cyber Monday), over a specific pre-defined period of time (for example, one minute) then prioritization for that particular application can be dynamically changed to be of a highest priority. Reprioritization such as this acknowledges that the application is likely being used by the end user(s) heavily for a particular purpose, such that it would be beneficial for the IMDG server 211 to provide responses to these data requests with highest priority.

A threshold volume of requests from an application can be defined, and if the request frequency exceeds the threshold then that application gets priority. It should be noted that the duration for maintaining the priority of a heavily used application should be minimized in or to avoid using significant memory for archiving. Thus, another setting can provide for when frequency of a particular application's requests falls to a level where archives of requests are deleted and prioritization is reestablished in another manner.

In an embodiment, requests from the application that is being prioritized are dynamically increased to a higher priority than the priority originally assigned to the application, but not necessarily changed to the highest priority available in the IMDG system.

In an embodiment, requests from the application are returned to an original priority, for example, after expiration of a predetermined duration following being dynamically changed to the higher priority.

C. Requests can be Prioritized Based on the Load on the Application During, e.g., Peak Time of Day or Date Range.

Such an approach may be viewed as "a peak time approach." In the peak time approach, a prioritization scheme has to be preconfigured or such that when a particular time of day or date arrives, the prioritization scheme is immediately implemented. Although needing to be preconfigured, the peak time approach yields very useful capability. For example, in the peak shopping days between Black Friday and Christmas, the eCommerce application 203 can maintain a highest priority position. The shipping application 209 might also have a higher priority during the peak holiday season. However, from the period after December 26 through early January, the customer service application 207 (useful in processing returns) can be assigned a highest priority.

D. Request(s) can be Prioritized Based on Explicit Priority Request Sent by the IMDG Client.

Such an approach may be viewed as "a client approach." In the client approach, requests can also be prioritized based on an explicit priority request sent by an IMDG client. That is to say, these explicit priority requests are initiated by the application in which the client is running. The application can trigger this request based on the rules defined internally to this application such as more load, preferred users, important operation, and the like.

However, limitations can be placed on the explicit request. The request prioritizer can limit such requests which it receives from the application, for example to a finite pre-determined number within a finite pre-determined duration, say one request every hour. Although, when the request prioritizer determines that all applications are running below their pre-determined maximum thresholds based on requests in the request queue of the request prioritizer, then the limit on requests over a time period could be overruled such that a particular request would not be counted towards the imposed limit, for example, a pre-determined limit of one request every hour.

Figure 3:
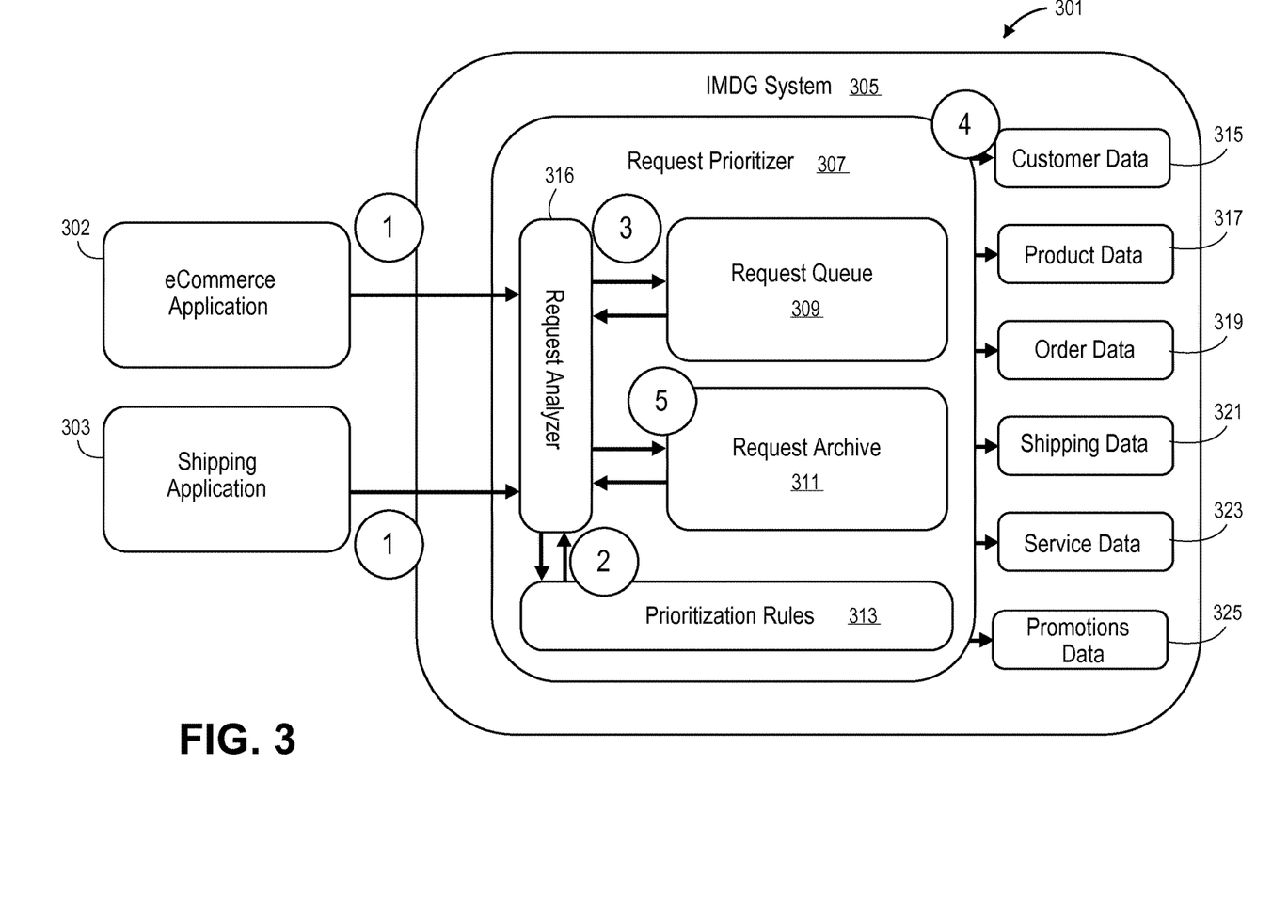
FIG. 3 is a diagram illustrating an example of the manner in which the request prioritizer operates in an IMDG system/server.

An example of the manner in which the request prioritizer operates is shown in the IMDGs system/server 301 illustrated in FIG. 3. In the example of FIG. 3, for simplicity is limited to just two applications: the eCommerce application 302 and the Shipping application 303. In FIG. 3, sequential steps are shown by one of integers 1-5 inside a circle. The remainder of this discussion will just refer to Step 1, Step 2, etc.

In Step 1, the eCommerce application 302 and Shipping application 303 make a request for customer data 315 from IMDG system/server 305. Each request is first received by the request prioritizer 307. In the request prioritizer 307, the request analyzer 316 is responsible for analysis of all incoming requests. The request analyzer 316 may store the logic by which prioritization is implemented.

In Step 2, the prioritization rules 313 are accessed by the request analyzer 316 during runtime when processing each request. In this scenario, the request analyzer 316 sees that two requests are received for the same customer data 315. Although not illustrated as such, the request analyzer 316 determines that the eCommerce application 302 is assigned a higher priority than the Shipping application 303, and therefore processes the request from the eCommerce application 302 first. Alternatively, the request from the eCommerce application 302 may have arrived prior to the request from the Shipping application 303.

In Step 3, the request from the Shipping application 303 is put in a Request Queue 309. The Request Queue 309 stores the request for later processing once a request currently being processed by the Request Analyzer 316 (i.e., the request from eCommerce application 302) has been completed. Of course in practice the Request Queue 309 can store more than simply one or two requests, i.e., a number of requests limited by available rapid access memory, far greater in number than the request stored in the simple example illustrated here.

In Step 4, customer data 315 is retrieved from the in-memory storage 315, using standard techniques. The customer data 315 is sent to the requesting eCommerce application 302, using standard techniques. Although in this example, customer data 315 is retrieved and then sent in response to the request, any data stored in the IMDG system 305 (e.g., any of product data 317, order data 319, shipping data 321, service data 323, and promotions data 325) can be retrieved and sent to the requesting application, depending on which application is making the request and depending on when it has been processed by the Request Prioritizer 307 according to the priority determined by logic by which prioritization is implemented, stored in, e.g., the Request Analyzer 316.

In Step 5, requests are archived asynchronously as they are received at the Request Analyzer 316, in the request archive 311, over a period of time. That is to say, over a certain period of time, the requests from the applications are received by the IMDG server/system 305 at differing times, which may or may not be predictable, such as when individual human users at the applications 302, 303 cause the applications 302, 303 to send requests (e.g., by shopping or shipping in this example). Asynchronous receipt of requests stored in the request archive 311 may be used for calculating frequency and/or other results that may aid in determining priority when the "frequency approach", the "peak time approach," and/or the "client approach" are employed. The request archive 311 can be further configured to manage its storage such as to delete older requests so that calculations make use of the most current requests.

IV. Implementation Details

Implementation details for the request prioritization options described above are now provided to further clarify the conceptual principles. As described above, the implementations can be achieved either programmatically or in a hard-wired configuration. Furthermore, examples are provided to illustrate the implementations, but embodiments should not be considered to be limited to these particular implementations.

A. Higher Priority Applications (Predetermined Priority) Approach

A complete application can be marked as higher priority when it is determined to have a predetermined priority which is more important than the other applications hitting the IMDG. This can be implemented by pre-defining the priority associated with each application in a configuration file, for example, as <requestpriority type="application" value="10.5.3.211, 10.5.3.188, 10.5.3.192, 10.5.3.199"/>.

The value is a list of IP addresses that identify originating servers in the incoming request. If all applications are running on the same server with a single IP address (which would be highly unlikely in an enterprise environment), then this technique which uses the originating server as a basis to determine and assign priority cannot be used effectively to prioritize requests.

The IMDG system loads the above-noted configuration file with the pre-defined priority for each application, for example during startup, and can hold the pre-defined request priorities in-memory during runtime. The configuration file conveniently can be held in the Prioritization Rules 313 within the Request Prioritizer 307 as shown in FIG. 3. When a request to retrieve data is received from an application, the Request Analyzer 316 can check the call against the prioritization rules and then fetches the value which corresponds to the origination of the request, e.g., the value which corresponds to the IP address of the server which is conventionally specified in the request for data. This can be implemented by modifying the usual "cache.get" file to check for request priority for that application before retrieving the value.

It may be briefly noted that if the Request Prioritizer 305 has no current requests, then request priority settings may be ignored. However, in the contrary situation where there are several contemporaneous requests, several implementation possibilities may be in play. Consider the following three possibilities.

1. The Application Making the Request is the First One in Priority

In a situation where an application request is already the highest priority, the cache.get works as it is intended. That is, in this situation, there is no need to mark the application request as a higher priority. The request is served, resulting in the data being returned back to the application quite quickly.

2. The Application Making the Request is not the First One in Priority

Where an application request is not the highest priority, the request may be put in wait mode. For example, the request can be kept in the Request Queue 309, such as by using the Java thread wait( ) call. Once a higher priority request is completed, a notify( ) message is sent to the second application thread (in the Request Queue 309). This process continues recursively until there is only one current request or all request priority value settings have been exhausted.

3. The Application Making the Request is not in the Priority List

It is possible that not all IP addresses or applications have been specified in a request priority setting that is pre-defined. Sometimes this is intentional, but it may occur simply because new servers are introduced in the environment and an administrator might simply miss updating the priority setting. In this scenario, the Request Prioritizer 307 can treat a new, unknown application as having the lowest priority.

B. Frequency Prioritization (Frequency) Approach

A frequency prioritization approach can be implemented by pre-defining the priority associated with frequency of requests and an associated duration in a frequency file. For example, to pre-define as a high frequency which will result in increased priority, 50 frequency requests during 1000 units of time (e.g., milliseconds), and optionally flushing archived requests after 10,000 units of time, the frequency file can be configured in the frequency approach as <requestpriority type="frequency" value="50" duration="1000" flush="10000"/>.

1. Requests are Increased in One Application

There are instances where for some unexpected reason, an application experiences rapidly increased traffic. As just one example, perhaps a sports team, against extreme odds, advances to a play an additional opponent in a subsequent event. Such an event might result in significantly increased traffic in an application related to acquiring tickets and/or other access to the subsequent event. Because such circumstances do arise on occasion, a priority scheme based on frequency of application use can be of tremendous importance.

2. Request Archive Monitors

As indicated above, the Request Archive 309 can maintain an archive of all application requests. The data relating to the archive can be stored in memory using two formats which are provided as non-limiting examples. The first format is App name, timestamp, which can keep track of all application requests by application name and time stamp that are received within the limit defined by a "flush" parameter in milliseconds. The second format is App, count, which can keep track of the total number of requests for an application within the duration specified by a "duration" parameter in milliseconds.

3. Automatically Clean Request Archive

An automated batch job can be run to purge old application timestamp records and to update an application count, for example at a pre-determined periodicity, or upon request. The Request Prioritizer 307 can review the application count, and if the application count exceeds a value specified in the "Value" parameter, the application will be moved into the first priority.

There is a possibility that multiple applications may each meet a frequency criteria equally. Frequency equality is an undesirable scenario. In that scenario, other settings for application priority or peak load may be used as a secondary measure to determine priority. If these secondary measures are not available, then the Request Prioritizer 307 can select one request to process, for example on a random basis, and can move the request to the Request Queue 309.

In practice, the likelihood of frequency equality is extremely small, although still possible. Still, the herein disclosed embodiments provide a process for handling frequency equality. An example of pseudo code to handle frequency equality between app 1 and app 2 includes:

---

Check frequency count of app 1 against threshold value
Check frequency count of app 2 against threshold value
If app1 count = app 2 count and greater than or equal to threshold value
Randomize requests
Pick first request and move the next to the request queue
Proceed with the request for app that has the greater frequency

---

C. Prioritization Based on Timing of a Peak Load (Peak Time) Approach

Prioritization of application requests based on peak load can be done according under three different principles which are provided by way of example. Also included in this section is pseudo-code for implementing such prioritization. Two or more of these approaches may or may not be combined, in embodiments.

1. Prioritize Requests During Pre-Specified Date/Time

<requestpriority type="peaktimestamps" value="IP address, start timestamp, end timestamp, IP address, start timestamp, end timestamp"/>

This prioritization scheme is very useful if it is known in advance that one or more application(s) will have a heavier load at a particular time of date/time. (Timestamp represents both date and time of day.) By accommodating the heavier load and assigning it a highest priority, more revenue and/or a better customer experience or similar benefit will result. Similar to that indicated above, an example is an online shopping site during a black Friday sale. The application request can be prioritized to accommodate the increase in site traffic.

2. Prioritize Requests Between Certain Hours

<requestpriority type="peaktime" value="IP address, start time, end time, IP address, start time, end time"/>

This prioritization scheme can be very useful in handling a daily peak load condition by prioritizing requests for particular applications. In particular, when different applications in the shared IMDG environment have different peak load hours, they do not have to compete for the available resources. A prioritization scheme emphasizing each application's daily peak load by start and end times can significantly improve efficiency for each application during its peak time.

3. Prioritize Requests on Certain Days

<requestpriority type="peakday" value="IP address, day(s), IP address, day(s)"/>

A peak time approach that focuses on certain days (for example, by date or by day of week) when a particular application will be making an exceptional number of data request of an IMDG can also very useful. For example, an enrollment or registration day at an educational institution where retrieval of data records will be continually necessary all day can benefit from a peak time approach that prioritizes particular days. Thus on registration day, prioritization of application requests for student data will ensure efficiency in processing, as well as provide an easier, more student-friendly experience.

D. Priority Request From IMDG Client (Client) Approach

In some instances, there simply may be no rational rule to be applied by an IMDG server 305 in determining priority of application requests. In some cases, an application can indicate which calls/requests need a higher priority than other requests.

1. Priority Request From Client

An IMDG client will get a new call from the Request Prioritizer 307 in the IMDG system/server 305 for the IMDG client to provide a request with a higher priority. This call may be, for example, a Boolean:

setPriority(HIGH)

In the above Boolean call, "HIGH" is a predefined constant in the IMDG application. This call can return true if the Request Prioritizer 307 is able to set the priority to high and can return false if the Request Prioritizer 307 is not able to set priority to high, for example if the Request Prioritizer 307 has another application that has already set the priority to high. Thus, in the absence of a more specific priority scheme, the client approach can be a first-come-first-served basis where the Request Prioritizer 307 determines whether an application has already used its privilege to set high priority, for example, in a defined period of time.

The Boolean call can be achieved by implementing two new properties in the Request Prioritizer 307 which can be held in the Request Analyzer 316. The two properties are:
highpriorityapp, and
highpriorityduration The first property highpriorityapp keeps track of the requesting application using the setPriority call by keeping the IP address of the application that made the call.

2. The IMDG Server Watches/Limits Client Requests for Higher Priority

The second property highpriorityapp can keep track of a duration, specified in minutes, of the time in which an application's request is treated with the highest priority. A technique such as background scheduler that wakes up periodically can be used to update the highpriorityapp property when the duration expires. If an application's request for highest priority indeed has expired, other applications may be queried with a setPriority(HIGH) call.

3. Different Strategies Themselves have a Hierarchy

It should lastly be noted that a defined strategy, such as the frequency approach, can be made to override the client approach under certain circumstances. For example, referring back to FIG. 1, if a Customer Service Application 107 requests to setup high priority for a duration of 60 minutes under the client approach, but during this time the eCommerce Application 103 begins experiencing heavy use such that the frequency of application requests from the eCommerce Application 103 exceeds a threshold defined in the frequency approach, then the eCommerce Application's 103 requests will attain the highest priority.

There is another mechanism for limiting the client approach that also works to the benefit of lower priority applications. If an application operating under the client approach with the highest priority is not experiencing heavy use or not exceeding frequency thresholds, a "low load" classification may be prefixed to the current high priority application title/status or be so flagged in some manner. Using the classification, the Request Prioritizer 307 can then be able to select a different application (one without the "low load" status) as an application able to assume a highest priority. That is to say, the Request Prioritizer 307 can search for "low load" applications in order to determine alternative applications whose requests will assume highest priority.

Succinctly put, the benefit of the above-described multi-layered implementation for request prioritization is that there is more flexibility to the applications to use the available memory in an IMDG depending on the needs of the applications' customer/users. The customer/users can be better served.

The herein disclosed embodiments optimize use of a shared resource, that is, an IMDG by avoiding contention and giving higher priority to the more important applications using the shared resource. By implementing the Request Prioritizer 307, the benefits to customer/users can be achieved and provide flexibility to extend further applications. Additionally, the Request Prioritizer 307 and the entire IMDGs system/server 301 can take only milliseconds to execute to avoid impacting the performance of IMDG or the requesting applications.

Figure 4:
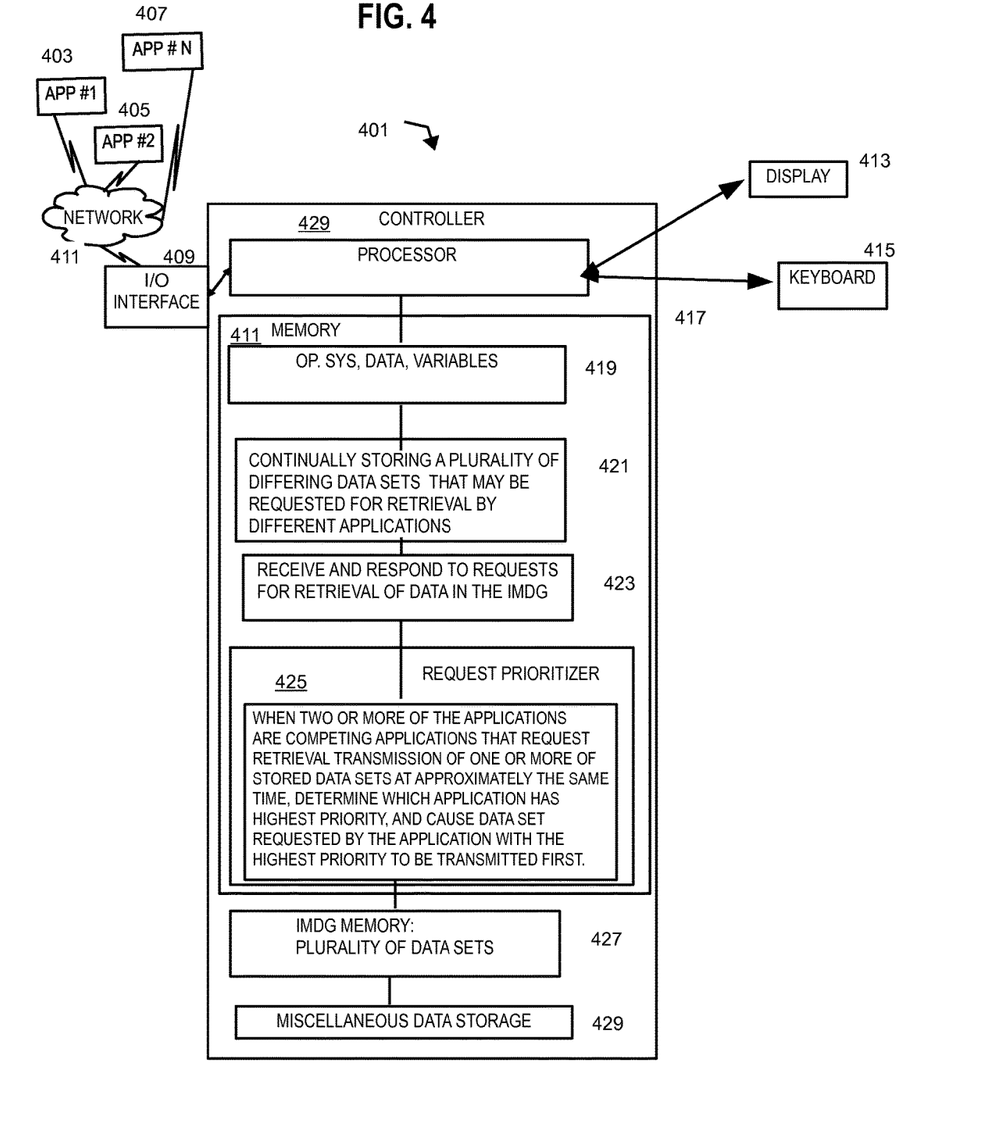
FIG. 4 is a block diagram illustrating an IMDG system/server with its basic functionality.

FIG. 4 is a block diagram illustrating relevant portions of an IMDG system/server 401 on which may be implemented the management of priority in requests to the IMDG. The IMDG system/server 401 can be a computer or computer system which may include one or more controllers 429, a processor 417, an input/output (i/o) interface 409 for communication such as over network 411, a memory 411, a display 413 (optional), and/or a user input device such as a keyboard 415. Alternatively, or in addition to the keyboard 415, a user input device may comprise one or more of various known input devices, such as a keypad, a computer mouse, a touchpad, a touch screen, and/or a trackball. The display 413 may present information to the user by way of a conventional liquid crystal display (LCD) or other visual display, and/or by way of a conventional audible device (for example, a speaker) for playing out audible messages. Portions of the IMDG system/server 401 are well understood to those of skill in this area and have been omitted to avoid obscuring the discussion.

The processor 417 may comprise one or more microprocessors and/or one or more digital signal processors. The memory 411 may be coupled to the processor 417 and may comprise a read-only memory (ROM), a random-access memory (RAM), a programmable ROM (PROM), and/or an electrically erasable read-only memory (EEPROM). The memory 411 may include multiple memory locations for storing, among other things, an operating system, data and variables 419 for programs executed by the processor 417; computer programs for causing the processor to operate in connection with various functions such as to continually store 421 the different data sets into the IMDG; to receive 423 and respond to requests for retrieval of data in the IMDG; and the request prioritizer 425. The computer programs may be stored, for example, in ROM or PROM and may direct the processor 429 in controlling the operation of the IMDG server/system 401 and in controlling the IMDG memory in which the data sets are stored. Each of these functions is considered in more detail below, to the extent that it is not detailed elsewhere in this document.

Responsive to instructions stored in memory 411, and/or automatically upon receipt of certain information via the i/o interface 409, the processor 417 may direct the execution of the stored programs.

The controller 429 can be responsible for overall operation of the IMDG system/server 429 (which in some embodiments is cloud-hosted). The request prioritizer 425 can be primarily responsible for prioritizing requests for the exchange of data between an IMDG system/server 401 and networked applications such as APP #1 403, APP #2 405, through APP #N 4071 the networked applications can be multi-tenant applications. In practice, the controller 429, memory 411, and IMDG memory 427 can be one and the same or they could operate separately and be distributed.

FIG. 4 illustrates IMDG memory 427 which has the data sets requested by the applications 403, 405, 307. The IMDG memory 427 can be provided according to conventional techniques. Thus, processor 429 and the request prioritizer processor 417 are cooperatively operable with the IMDG memory 427 which is stored within a RAM of the IMDG system/server 401. Data sets, from which data is to be retrieved in response to requests from applications 403, 405, 407, are stored in the IMDG memory 427.

The input/output (I/O) interface 409 is representative of any way to provide communication over the computer network 411 (for example, possibly as a transceiver). The I/O interface 409 can be used for reception and transmission from the applications 403, 405, 407. From the viewpoint of the applications 403, 405, 407, the IMDG system/server 401 may be in the "cloud."

The processor 429 may be programmed for continually storing 421 a plurality of differing data sets that may be requested for retrieval transmission to one or more of a plurality of applications 403, 405, 407 which may be connected from time to time to the IMDG system/server 401 via the network 411. This functionality can be provided according to known techniques.

The processor 429 also may be programmed to receive and respond to requests for retrieval of data in the IMDG. This functionality and the format of the requests themselves also may be provided according to known techniques.

The processor 429 also may be programmed with the request prioritizer 425 which prioritizes the requests to counteract contention which for the IMDG (as a resource), with the intention of achieving good performance for the clients which are the most important. Among other things, the request prioritizer 425 can determine whether two or more of the applications 403, 405, 407 are competing applications that request retrieval transmission of one or more of the data sets 425 at approximately the same time (that is, when there are two or more simultaneously pending requests for the data from the IMDG), which of the applications with pending requests has the highest priority. The request prioritizer can cause a request for a data set, which was requested by the application with the highest priority, to be responded to first by the IMDG, for example, by controlling when the requests for data are received and/or responded to 423.

As will be understood in this field, the memory 411 also can include locations for other miscellaneous data 429 along with the usual temporary storage and other instructions for other programs not considered herein.

Figure 5:
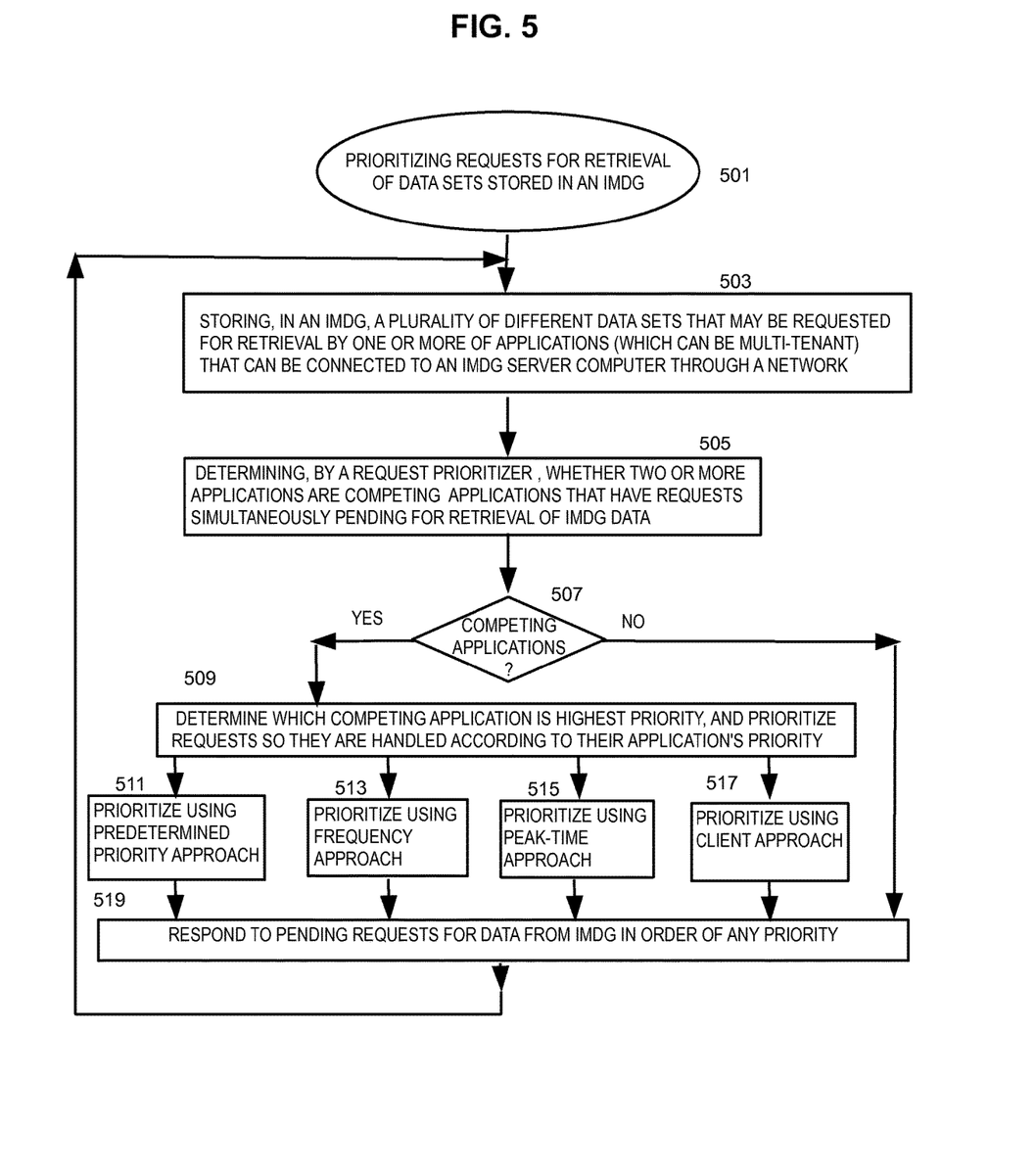
FIG. 5 is a flow chart illustrating a method of prioritizing requests for retrieval of data sets stored in an IMDG.

Reference is now made to FIG. 5, which is a flow chart illustrating a process 501 of prioritizing requests for retrieval of data sets stored in an IMDG. The process 501 can conveniently be implemented on the IMDG system/server of FIG. 4, or on another apparatus which is appropriately configured.

The process 501 includes storing 503, into the IMDG, a plurality of different data sets; some or all of the data in the data sets may be requested for retrieval by one or more of a plurality of different applications. The data in the data sets can be updated from time-to-time, as is known in the field. Storing the different data sets into the IMDG can also be performed according to known techniques.

The process 501 further includes determining 505, by a request prioritizer, when two or more of the applications are competing applications that have request retrieval transmission of one or more of the data sets at a timing so that the requests are simultaneously pending whilst awaiting being fulfilled, which of the two or more applications has a highest priority (at least relative to the other applications which have requests pending), such that data from a data set requested by the application with the highest priority is responded to and transmitted to that application before the data requests by the other applications which do not have the highest priority. Note that the request prioritizer can temporarily store pending requests prior to be handled, so that the pending requests can be addressed after being prioritized.

When it is determined 507 that there are no competing applications, then the process 501 can respond 519 to the pending requests for data from the IMDG in their usual order. Known techniques can be used to respond to the requests. Particularly, the requests for data, which have not been prioritized, can be sent to the conventional IMDG server for handling as usual.

When it is determined 507 that there are competing applications, then the requests are prioritized. The process 501 can use one or more of different techniques for prioritizing, all of which have been discussed in more detail above. The techniques used for prioritizing can include one or more of: to prioritize 511 using the predetermined priority approach; to prioritize 513 using the frequency approach; to prioritize 515 using the peak-time approach; and/or to prioritize 517 using the client approach. Note that the process 510 need not use all of these techniques 511, 513, 515, 517, and need not use all of selected techniques all of the time. That is, particular techniques can be enabled and/or disabled for usage. Furthermore, the process 501 can apply one or more techniques at the same time. For example, a process 501 may generally be applying the peak-time 515 approach and the frequency approach 513 so that a suddenly excessively-used application can be assigned highest priority even while applications are prioritized ordinarily via the peak-time approach. In this case, after prioritizing the pending requests, the process 501 can respond 519 to the pending requests for data from the IMDG according to their now-prioritized order. Known techniques can be used to respond to the requests. Particularly, the now-prioritized requests for data can be sent to a conventional IMDG server to be handled as usual.

V. Glossary

Terms as used herein are intended to be interpreted, at a first level as understood to one of skill in the arts both of resource contention and providing an In-Memory Data Grid; and if not interpretable at the first level, then at a second level as understood to one of skill in the art of computer science and information science; and then if not interpretable according to the first level and second level, according to a more general dictionary.

Other definitions may be specified in this document.

The designation "in-memory data grid" (abbreviated as IMDG) is a term conventionally used to refer to a conventional data structure that resides entirely in RAM (random access memory), and may or may not be distributed among multiple servers; an IMDG provides applications, which typically are remotely located relative to the IMDG, the ability to at least access data sets which typically are extremely large, so as to provide relatively quick handling of data within extremely large data sets; the IMDG is served by a server system that receives and responds to the requests; the form of the requests is prescribed by the server; typically the applications which request the data from the IMDG server include a client component.

The term "multi-tenancy" (and the similar terms "multi-tenant" and "multiple-tenants") is used herein to denote an architecture in which a single instance ofa software application serves multiple customers or clients.

The term "computer system" or "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The phrase "automatically without manual intervention," when used in a claim, is defined to mean that the particular step occurs after the step is initiated until limitations recited in that particular step are finished without requiring a user to provide input to a processor.

VI. Implementations and Technical Notes

The above discussion has assumed that the reader has a sufficient background for appreciating the points made. This section provides some supplementary implementation and/or technical notes which discuss some basic technical information that may be relevant to the above.

The various embodiments which demonstrate a system, method, and/or medium for managing priority in requests to an In-Memory Data Grid (IMDG) have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The system used in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An in-memory data grid (IMDG) server comprising:
an input/output (i/o) interface for transmitting and receiving data over a network;
a random access memory (RAM) configured with an IMDG storing a plurality of different data sets; and
a processor, which is cooperatively operable with the i/o interface and the RAM, and is configured to:
receive from one or more of a plurality of applications, configured to be connected to the IMDG server through the network, requests for retrieval of data in one or more of the plurality of different data sets;
determine whether at least two of the plurality of applications are competing applications, which have requests for retrieval of data in the one or more of the plurality of data sets simultaneously pending at the IMDG server
when it is determined that there are competing applications, further:
determine a highest priority application, which of the competing applications with simultaneously pending requests, is the application having a highest priority relative to other ones of the competing applications, and
cause a simultaneously pending request which was requested by the highest priority application to be responded to, by sending requested data to the highest priority application, before responding to other simultaneously pending requests requested by the other ones of the competing applications;
determine whether a totality of all requests from the plurality of applications, for retrieval of data in the plurality of different data sets, is greater than a threshold over a given time frame;
when it is determined that the totality of all requests is greater than the threshold over the given time frame, limit transmission of requested data sent to the highest priority application to a pre-determined limit; and
when it is determined that a totality of all requests is not greater than the threshold over the given time frame, refrain from limiting transmission of requested data sent to the highest priority application to the pre-determined limit.

2. The IMDG server according to claim 1, wherein the processor determines the highest priority application of the competing applications based on an explicit request by an IMDG client that coordinates the competing applications, the explicit request further establishing internal rules for determining which of the competing applications should be the highest priority application.

3. The IMDG server according to claim 1, wherein the processor determines the highest priority application of the competing applications based on an internal predetermined priority policy of the IMDG server.

4. The IMDG server according to claim 1, wherein the processor determines the highest priority application of the competing applications based on a frequency of requests, by the highest priority application, for retrieval of data in the plurality of different data sets, exceeding a pre-determined threshold over a predetermined period of time.

5. The IMDG server according to claim 4, wherein the processor is further configured to:

determine whether there is a diminishment in the frequency of requests, by the highest priority application, for the retrieval of data in the plurality of different data sets, to below the pre-determined threshold over the predetermined period of time, and
when it is determined that there is the diminishment, deassign the highest priority application so it is no longer the highest priority application.

6. The IMDG server according to claim 1, wherein the processor is further configured to:
recognize a predetermined time of day or an entire predetermined day as being a peak time for a particular application to predictably make a high number of requests for retrieval of data in the plurality of different data sets, and
when the competing applications have requests for retrieval of data in the one or more of the plurality of data sets simultaneously pending at the peak time, determine the highest priority application to be the particular application likely to make an exceedingly high number of requests for retrieval of data.

7. A method, implemented in an in-memory data grid (IMDG) server comprising a random access memory (RAM) configured with an IMDG, an input/output (i/o) interface for transmitting and receiving data over a network, and a processor which is cooperatively operable with the i/o interface and the RAM, the method comprising:
storing, by the processor, in the IMDG, a plurality of different data sets;
receiving, by the processor, from one or more of a plurality of applications configured to be connected to the IMDG server through the network, requests for retrieval of data in one or more of the plurality of different data sets;
determining, by the processor, whether at least two of the plurality of applications are competing applications, which have requests for retrieval of data in the one or more of the plurality of data sets simultaneously pending at the IMDG server;
when it is determined that there are competing applications, further:
determining, by the processor, a highest priority application, which of the competing applications with simultaneously pending requests, is the application having a highest priority relative to other ones of the competing applications, and
causing, by the processor, a simultaneously pending request, which was requested by the highest priority application, to be responded to, by sending requested data to the highest priority application, before responding to other simultaneously pending requests requested by the other ones of the competing applications;
determining, by the processor, whether a totality of all requests from the plurality of applications, for retrieval of data in the plurality of different data sets, is greater than a threshold over a given time frame;
when it is determined that the totality of all requests is greater than the threshold over the given time frame, limiting, by the processor, transmission of requested data sent to the highest priority application to a pre-determined limit; and
when it is determined that a totality of all requests is not greater than the threshold over the given time frame, refraining from limiting, by the processor, transmission of requested data sent to the highest priority application to the pre-determined limit.

8. The method according to claim 7, wherein
determining the highest priority application of the competing applications is based on an explicit request by an IMDG client that coordinates the competing applications, the explicit request further establishing internal rules for determining which of the competing applications should be the highest priority application.

9. The method according to claim 7, wherein
determining the highest priority application of the competing applications is based on an internal predetermined priority policy of the IMDG server.

10. The method according to claim 7 wherein
determining the highest priority application of the competing applications is based on a frequency of requests, by the highest priority application, for retrieval of data in the plurality of different data sets, exceeding a pre-determined threshold over a predetermined period of time.

11. The method according to claim 10, further comprising:
determining, by the processor, whether there is a diminishment in the frequency of requests by the highest priority application, for the retrieval of data in the plurality of different data sets, to below the pre-determined threshold over the predetermined period of time, and
when it is determined that there is the diminishment, deassigning, by the processor, the highest priority application so it is no longer the highest priority application.

12. The method according to claim 11, further comprising:
recognizing, by the processor, a predetermined time of day or an entire predetermined day as being a peak time for a particular application to predictably make a high number of requests for retrieval of data in the plurality of different data sets, and
when the competing applications have requests for retrieval of data in the one or more of the plurality of data sets simultaneously pending at the peak time, determining, by the processor, the particular application likely to make an exceedingly high number of requests for retrieval of data.

13. A non-transitory, computer-readable storage medium with instructions stored thereon, which when executed by a processor in an in-memory data grid (IMDG) server that has an input/output (i/o) interface that transmits and receives data over a network, and that has a random access memory (RAM) that stores an IMDG, the processor being cooperatively operable with the RAM and the i/o interface, performs a method comprising:
storing, by the processor, in the IMDG, a plurality of different data sets;
receiving, by the processor, from one or more of a plurality of applications configured to be connected to the IMDG server though the network, requests for retrieval of data in one or more of the plurality of different data sets;
determining, by the processor, whether at least two of the plurality of applications are competing applications, which have requests for retrieval of data in the one or more of the plurality of data sets simultaneously pending at the IMDG server;
when it is determined that there are competing applications, further:
determining, by the processor, a highest priority application, which of the competing applications with simultaneously pending requests, is the application having a highest priority relative to other ones of the competing applications; and
causing, by the processor, a simultaneously pending request, which was requested by the highest priority application, to be responded to, by sending requested data to the highest priority application, before responding to other simultaneously pending requests requested by the other ones of the competing applications;
determining, by the processor, whether a totality of all requests from the plurality of applications, for retrieval of data in the plurality of different data sets, is greater than a threshold over a given time frame;
when it is determined that the totality of all requests is greater than the threshold over the given time frame, limiting, by the processor, transmission of requested data sent to the highest priority application to a pre-determined limit; and
when it is determined that a totality of all requests is not greater than the threshold over the given time frame, refraining from limiting, by the processor, transmission of requested data sent to the highest priority application to the pre-determined limit.

14. The non-transitory, computer-readable storage medium according to claim 13, wherein:
determining the highest priority application of the competing applications is based on an explicit request by an IMDG client that coordinates the competing applications, the explicit request further establishing internal rules for determining which of the competing applications should be the highest priority application.

15. The non-transitory, computer-readable storage medium according to claim 13, wherein:
determining the highest priority application of the competing applications is based on an internal predetermined priority policy of the IMDG server.

16. The non-transitory, computer-readable storage medium according to claim according to claim 13, wherein:
determining the highest priority application of the competing applications is based on a frequency of requests, by the highest priority application, for retrieval of data in the plurality of different data sets, exceeding a pre-determined threshold over a predetermined period of time.

17. The non-transitory, computer-readable storage medium according to claim 16, comprising further instructions such that the method further comprises:
determining, by the processor, whether there is a diminishment in the frequency of requests by the highest priority application, for the retrieval of data in the plurality of different data sets, to below the pre-determined threshold over the predetermined period of time, and
when it is determined that there is a diminishment, deassigning, by the processor, the highest priority application so it is no longer the highest priority application.

* * * * *